United States Patent
Chase et al.

(10) Patent No.: US 12,499,308 B2
(45) Date of Patent: Dec. 16, 2025

(54) SYSTEMS AND METHODS FOR GENERATING DIAGNOSTIC ASSETS FOR INFORMATION RETRIEVAL AND NETWORK PATHWAY GUIDANCE

(71) Applicant: Capital One Services, LLC, McLean, VA (US)

(72) Inventors: Jalen Isaiah Chase, McKinney, TX (US); Matthew Evan Skinner, Little Elm, TX (US)

(73) Assignee: Capital One Services, LLC, McLean, VA (US)

( * ) Notice: Subject to any disclaimer, the term of this patent is extended or adjusted under 35 U.S.C. 154(b) by 269 days.

(21) Appl. No.: 18/325,991

(22) Filed: May 30, 2023

(65) Prior Publication Data
US 2024/0403553 A1    Dec. 5, 2024

(51) Int. Cl.
*G06F 40/211*    (2020.01)
*G06F 40/40*    (2020.01)

(52) U.S. Cl.
CPC ............ *G06F 40/211* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 10,671,653 B2 * | 6/2020 | Tijssen | G06F 16/90328 |
| 10,949,618 B2 * | 3/2021 | Zhou | G06N 5/022 |
| 11,068,286 B2 * | 7/2021 | Gupta | G06F 16/24 |
| 11,113,175 B1 * | 9/2021 | Adamo | G06F 40/216 |
| 12,141,534 B2 * | 11/2024 | Moore | G06N 5/02 |
| 2007/0094183 A1 * | 4/2007 | Paek | G06F 16/36 |
| | | | 706/45 |
| 2016/0180216 A1 * | 6/2016 | Allen | G06F 40/169 |
| | | | 706/46 |
| 2018/0255006 A1 * | 9/2018 | Kamat | H04L 51/02 |
| 2018/0268309 A1 * | 9/2018 | Childress | G06F 40/237 |
| 2019/0188316 A1 * | 6/2019 | Huang | G06F 40/20 |
| 2019/0188645 A1 * | 6/2019 | Monasor | G06Q 10/1053 |
| 2019/0286968 A1 * | 9/2019 | Erpenbach | G06F 40/30 |
| 2020/0167432 A1 * | 5/2020 | Sekharan | G06F 40/274 |
| 2020/0210469 A1 * | 7/2020 | Van Rensburg | G06F 16/337 |
| 2020/0250273 A1 * | 8/2020 | Ekambaram | G06V 10/764 |
| 2020/0356604 A1 * | 11/2020 | Macdougall | G06N 20/00 |
| 2021/0026878 A1 * | 1/2021 | Robert Jose | G06F 16/907 |
| 2021/0073302 A1 * | 3/2021 | Srinivasaraghavan | G06F 40/205 |
| 2021/0192134 A1 * | 6/2021 | Yue | G06F 40/40 |
| 2021/0240776 A1 * | 8/2021 | Jawagal | G06N 3/049 |
| 2021/0304024 A1 * | 9/2021 | Baughman | H04L 67/535 |
| 2022/0129631 A1 * | 4/2022 | Yim | G06F 40/205 |

(Continued)

*Primary Examiner* — Douglas Godbold
(74) *Attorney, Agent, or Firm* — Foley & Lardner LLP (57) ABSTRACT

Methods and systems are provided for information retrieval pathway guidance. In particular, the systems and methods provided apply artificial intelligence to novel tasks related to retrieving remotely accessible data such as detecting competency levels of users, generating personalized guidance for individual users based on the retrieval goals and initial competency level of a user, generating custom diagnostic assets for those goals based on current strengths and weaknesses, generating content for custom questions for those diagnostic assets, and dynamically tracking and updating the competency level of the user during the course.

16 Claims, 5 Drawing Sheets

(56) References Cited

U.S. PATENT DOCUMENTS

| | | | | |
|---|---|---|---|---|
| 2022/0198136 A1* | 6/2022 | Peleg | .................... | G06F 40/253 |
| 2022/0405484 A1* | 12/2022 | Kanchibhotla | ........ | G06N 5/022 |
| 2023/0037894 A1* | 2/2023 | Arya | ...................... | G06F 40/40 |
| 2023/0042940 A1* | 2/2023 | Derbier | ................ | G06F 40/211 |
| 2023/0214601 A1* | 7/2023 | Moore | .................... | G06F 40/35 |
| | | | | 704/9 |
| 2024/0111495 A1* | 4/2024 | Boina | ...................... | G06F 8/33 |
| 2024/0378374 A1* | 11/2024 | Dixon | .................... | G06T 11/60 |

\* cited by examiner

SYSTEMS AND METHODS FOR GENERATING DIAGNOSTIC ASSETS FOR INFORMATION RETRIEVAL AND NETWORK PATHWAY GUIDANCE

BACKGROUND

Information is increasingly stored in electronic formats and in disparate and diverse locations. These disparate and diverse locations may include different platforms, different physical devices and/or cloud storage arrangements, and different geographical locations. Furthermore, accessing these disparate and diverse locations may require users to understand how to navigate these different platforms, which devices and/or formats the information is stored in, and/or what network pathways and systems must be used to acquire this information.

To further complicate information retrieval, access to some information may be affected by circumstances specific to local storage device and/or physical locations. For example, information in one geographic location may only be accessible via a first platform and/or application, whereas information in another geographic location may only be accessible via a second platform and/or application. Similarly, information retrieval may be subject to specific local requirements (e.g., enforced by a storage device, geographic jurisdiction, etc.) that require requests for information to be provided in a particular manner, have particular authorization, and/or include particular supporting documents. Beyond having user competency in the required platform and/or local requirements, some information retrieval may be subject to other local considerations (e.g., fees and currency used to access information, specific languages in which information must be requested, etc.).

SUMMARY

Accordingly, methods and systems are provided herein for improvements to providing information retrieval (and/or submission) and network pathway guidance for that information. For example, in order to provide improvements to the information retrieval process, the system may first determine a competency of a user in retrieving a given piece of information. Based on this competency, the system may generate personalized information retrieval guidance. This information retrieval guidance may take the form of images, textual descriptions, and/or other content. For example, if a user is not competent in the use of a platform through which information must be received, the system may generate information retrieval guidance that provides a walkthrough of the platform. In another example, if a user is not competent in navigating a computer intake system through which information must be received but is competent in the platform, the system may generate information retrieval guidance that provides guidance related to navigating the computer intake system, but not the platform.

However, determining the competency of the user in retrieving the given piece of information is inherently difficult. One solution to this problem would be to query the user with one or more questions. This solution faces a fundamental problem in that the number of queries that would be required to determine the level of competency of the user would be burdensome to the user and negatively affect the user experience. To limit the number of queries that are required, the systems and methods select diagnostic assets (e.g., content featuring the information describing how to access, retrieve, etc. the information). While interactive diagnostic assets may be initially more appealing than simple questions, untargeted and repetitive diagnostic assets may become equally tedious. Furthermore, if the diagnostic assets themselves comprise information and/or instructions that a user does not comprehend, the diagnostic asset is not helpful. Accordingly, to improve the information retrieval, the system needs to accomplish two objectives. First, the system must limit the amount of content used to determine (i) what information needs to be retrieved and (ii) how competent a user is in the systems used to retrieve that information. Second, the system must ensure that whatever content is used is accurate and precise.

To overcome this technical challenge, and to improve the accuracy and/or precision of the diagnostic assets in accessing the information needed and the competency of the user, the system may (e.g., using a part-of-speech tagging algorithm) identify specific words and/or phrases within each of the diagnostic assets. These words and/or phrases may include specific parts of speech (e.g., a noun, verb, adjective, etc.) as specific parts of speech may be more indicative of, or relevant to, a given user's competency and/or the information needed.

For example, in response to a user input indicating that the user needs to retrieve information from a given geographic location (e.g., "Arizona"), the system may select a diagnostic asset corresponding to the need (e.g., a walkthrough or tutorial of accessing information in that specific geographic location). The system may detect that the noun (e.g., "Arizona") is likely to be more indicative of (i) what information needs to be retrieved and (ii) how competent a user is in the systems related to that part-of-speech (e.g., the systems of Arizona). The system may then determine to test that part of speech (e.g., by generating an information retrieval question corresponding to "Arizona"). For example, while determining competency using qualitative descriptions (e.g., "How well do you understand retrieving documents from Arizona?") may be difficult, by isolating the fact that documents are required for the location (e.g., based on the part-of-speech tagging), the diagnostic asset may comprise a targeted question that tests the competency of the user for information retrieval corresponding to the particular part of speech. As such, the system may receive a user response to the information retrieval question and then determine a user competency level based on the user response. Based on the user competency level, the system may then generate information retrieval guidance specific to the user.

In another example, in response to a user input indicating that the user needs to "submit" information, the system may detect that the verb (e.g., "submit") is likely to be more indicative of (i) what information needs to be retrieved and (ii) how competent a user is in the systems to retrieve that information than other parts of speech. The system may then determine to test that part of speech (e.g., by generating an information retrieval question corresponding to "submit"). For example, while determining competency using qualitative descriptions (e.g., "How well do you understand submission requirements?") may be difficult, by isolating the fact that submissions require a specific format (e.g., based on the part-of-speech tagging of the verb), the diagnostic asset may comprise a targeted question that tests the competency of the user in the submission requirements. Furthermore, the system may further combine multiple part-of-speech tags (e.g., based on both the noun and the verb) to generate an information retrieval question corresponding to "submission" requirements in "Arizona."

In some aspects, systems and methods are described for providing information retrieval and network pathway guidance using natural language processing. For example, the system may receive a user input of remote information for retrieval. The system may select a diagnostic asset corresponding to the remote information. The system may process the diagnostic asset using a part-of-speech tagging algorithm to label a first word of the diagnostic asset as corresponding to a first part-of-speech type and a second word of the diagnostic asset as corresponding to a second part-of-speech type. The system may select a part-of-speech type for testing in the diagnostic asset. The system may determine that the first part-of-speech type corresponds to the part-of-speech type for testing. The system may, in response to determining that the first part-of-speech type corresponds to the part-of-speech type for testing, generate an information retrieval question corresponding to the first word.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Finally, while the embodiments and examples described herein relate to determining user competency in information retrieval, it should be noted that alternative or additional learning and/or entertainment objectives may be achieved. For example, the embodiments and examples described herein may be used to generate content for any learning and/or entertainment objective.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
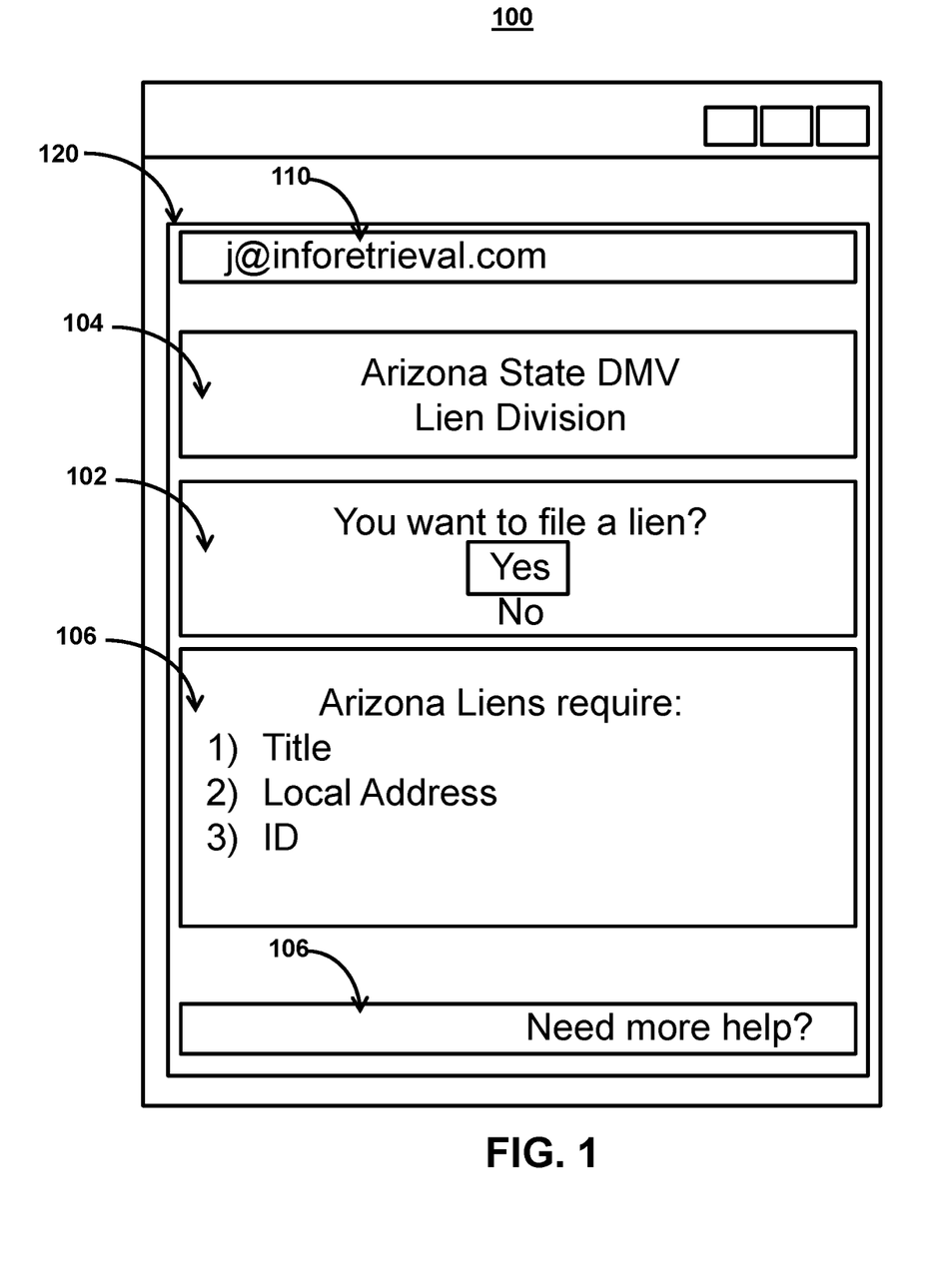
FIG. 1 shows an illustrative system for providing information retrieval and network pathway guidance, in accordance with one or more embodiments.

FIG. 1 shows an illustrative system for providing information retrieval and network pathway guidance, in accordance with one or more embodiments. It should be noted that throughout this disclosure the embodiments disclosed herein may be applied to both information retrieval and/or information submission. Accordingly, terms such as "retrieval" should be read to encompass other actions such as "access," "submit," etc. That is, the systems and methods described herein include not only the retrieval of information, but the access to that information, submission of information, etc. For example, the system may receive a user input of remote information for retrieval, wherein the remote information may refer to how to submit information (e.g., an online form) to a remote storage location.

For example, FIG. 1 shows user interface 100. User interface 100 may represent an example of a user interface that appears on a user device (e.g., device 222 or device 224 (FIG. 2)) as a user interacts with an information retrieval application. User interface 100 may include any means by which the user and a computer system interact. User interface 100 may include multiple input and/or output devices and may be run using software.

User interface 100 may generate content related to information retrieval guidance and information retrieval questions. As referred to herein, information retrieval guidance may comprise content used to assist and/or facilitate the retrieval of information by a user. In contrast, as referred to herein, information retrieval questions may refer to content used to determine a current user's competency level in retrieving information. Both information retrieval guidance and information retrieval questions may comprise content.

As shown in FIG. 1, user interface 100 is currently being populated with diagnostic asset 120. As referred to herein, a "diagnostic asset" may comprise any content that provides information retrieval guidance and/or, in some instances, information retrieval questions. The diagnostic asset may include manuals, tutorials, walkthroughs, and/or other content related to information and/or the access to that information. In some embodiments, the system may modify one or more characteristics in the diagnostic asset. For example, the system may select a diagnostic asset featuring one or more characteristics and populate that diagnostic asset with content and/or modify the characteristics of the diagnostic asset. In some embodiments, a diagnostic asset may comprise content having a plurality of sections.

As referred to herein, a "section" may comprise any of the more or less distinct parts into which the content may be divided or from which the content is made up. For example, a section may be distinguished from another section by one or more section characteristics. In diagnostic asset 120, the system may identify a section of the plurality of sections as having a section characteristic.

A section characteristic may comprise any characteristic that distinguishes one section from another. For example, a section characteristic may be media-related information (e.g., ordering, heading information, titles, descriptions), ratings information (e.g., parental control ratings, critic's ratings, etc.), source code data (e.g., HTML, source code headers, etc.), genre or category information, subject matter information, author/actor information, logo data or other identifiers for the content provider, media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, diagnostic asset 120 may include a section dedicated to question 102, source 104, and/or guidance 106. The system may identify a section based on a paragraph, a section break, and/or an HTML tag. The system may parse the section for a content characteristic (e.g., content characteristic) and metadata describing the content characteristic, wherein the metadata indicates a context of the content characteristic, and wherein the content characteristic comprises human-readable text. For example, as shown in diagnostic asset 120, the system may identify content for each section based on a content characteristic. As referred to herein, a "content characteristic" may comprise any of the more or less distinct parts into which the section may be divided or from which the section is made up. For example, a content characteristic may be anything that may distinguish one content characteristic from another. In some embodiments, the content characteristic may be human-readable text. For example, the content characteristic may be a keyword, an image, an embedded object, etc.

The system may generate a content map for the section based on the parsing, wherein the content map indicates a position of the content characteristic in the section. For example, the content map may include each content characteristic of a given section with the distances and/or positions indicated. For example, the system may determine a CSS ("Cascading Style Sheets") position property for each characteristic. In another example, the system may use HTML absolute positioning to define a content map.

The system may then generate a feature input based on the content map and the metadata, wherein the feature input comprises a vector array of values indicative of the content map and the metadata. For example, the system may use a generative adversarial network, wherein the generative adversarial network is trained to generate outputs of content for different sections in order to provide information retrieval and network pathway guidance, wherein the sections correspond to content maps and have content characteristics at predetermined positions.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance.

User interface 100 currently displays user profile 110. User profile 110 may identify the name and/or personal information about a user. Additionally or alternatively, user profile 110 may include information specific to the user. This may include geographic and/or demographic information. User profile 110 may also include a current user competency level and/or the specific strengths, weaknesses, and/or interests of the user. User profile 110 may accumulate this information either actively or passively. For example, user profile 110 may be populated by information gathered directly from a user (e.g., via questionnaires) or information that is gathered automatically (e.g., by monitoring one or more user actions). User profile 110 may also include information received about the user from third-party sources. User profile 110 may also include personality traits, social and behavioral information, and consumer information (e.g., buying habits, debt levels, previous exposure to advertisements and/or the results of that exposure to advertisements). This information in user profile 110 may be used by the system to tailor the learning experience of the user and generate personalized diagnostic assets for the user. For example, user profile 110 may include a content type preference. Based on this content type preference, the system may select diagnostic assets that meet this preference.

The system may monitor a plurality of user actions. User actions may include any active or passive actions taken by the user while interacting with the application. For example, user actions may include user inputs of the user such as requesting/filing information, requesting additional information (e.g., in response to a question), selecting correct (or incorrect) answers, etc. In addition to monitoring user actions, the system may monitor characteristics of user actions. Characteristics of user actions may include any feature or trait of the user action. For example, a characteristic may include the length of time of a user action (e.g., how long a user read a diagnostic asset or deliberated over a question), the frequency of a user action (e.g., how often a user requested a translation of a word or a type of word), the number of a user action (e.g., the number of times a user chose a correct or incorrect answer), etc.

In addition to monitoring user actions and the characteristics of those user actions, the system may track a diagnostic asset, question, word, and/or other subject matter corresponding to the user action. For example, the system may store the diagnostic asset or word subject to the user action for use in personalizing future content and/or determining the competency level of the user. The system may, e.g., determine a difficulty of a diagnostic asset question based on the user actions associated with it. Likewise, the system may determine a competency level of the user based on the difficulty of a diagnostic asset that was subject to a user action.

The system may track and determine a competency level of the user. The competency level of the user may be a quantitative or qualitative assessment of the user's mastery of a given information task. In some embodiments, the system may track an overall competency level and/or one or more other competency levels (e.g., corresponding to a user's mastery of a particular task). For example, the system may track multiple competency levels of the user, each corresponding to a different information task (e.g., retrieving information from one system, submitting information to another system, etc.). The system may then aggregate these various task competencies to determine an overall competency level of the user.

The system may also allow a user to access additional guidance (e.g., via guidance 106). The system may use this additional guidance to directly influence the competency level of the user. For example, in response to a user selection, the system may increase (or decrease) the competency level of the user.

The generated content may take the form of a question (e.g., an information retrieval question). The question may have a plurality of formats. For example, as shown in FIG. 1, question 102 requests the user enter a yes or no response (e.g., via an icon selection). User interface 100 also indicates the remote source of information (e.g., source 104) and provides additional information retrieval guidance (e.g., guidance 106).

Figure 2:
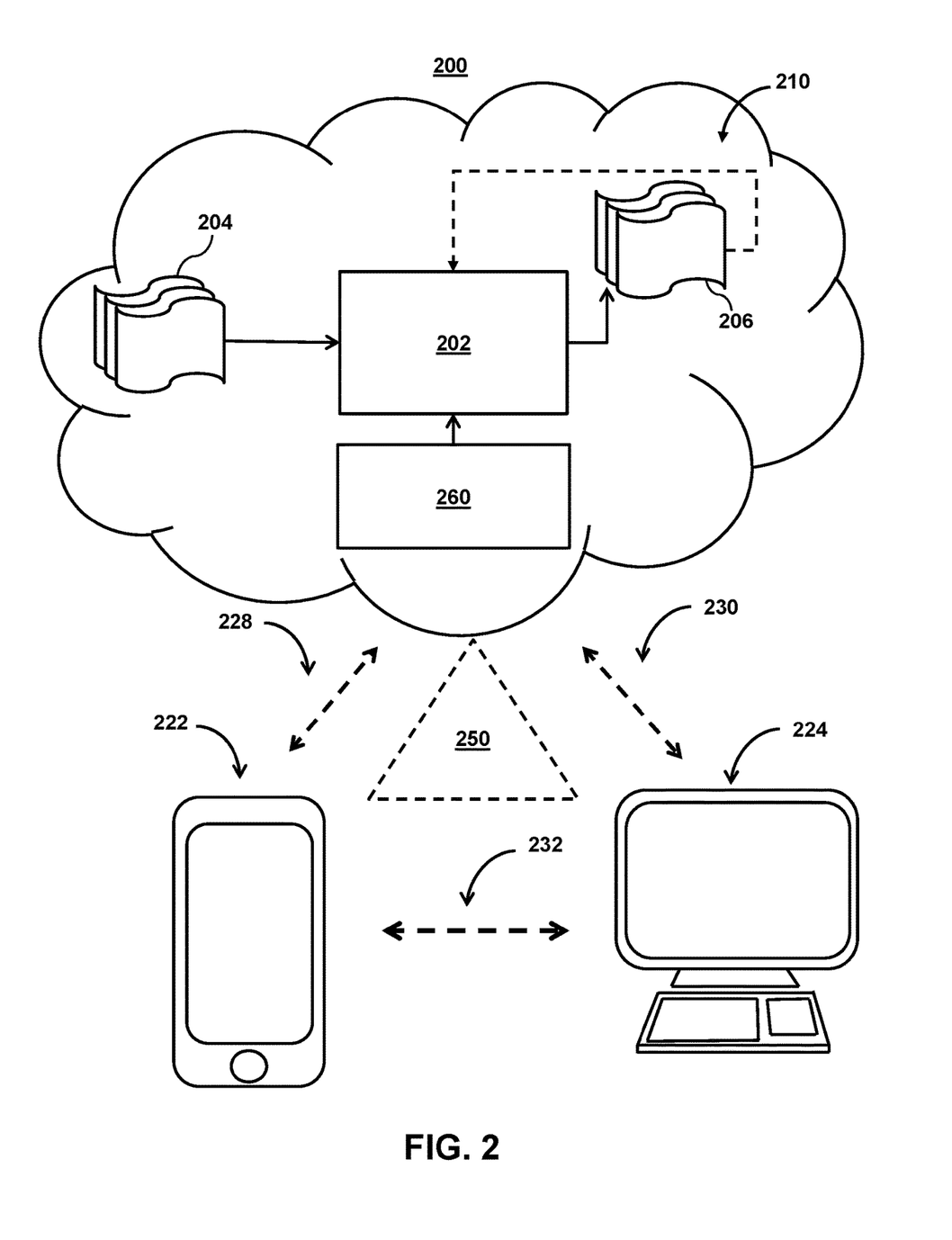
FIG. 2 shows a system diagram for providing information retrieval and network pathway guidance, in accordance with one or more embodiments.

FIG. 2 shows a system diagram for providing information retrieval and network pathway guidance, in accordance with one or more embodiments. As shown in FIG. 2, system 200 may include user device 222, user device 224, and/or other components. Each user device may include any type of mobile terminal, fixed terminal, or other device. Each of these devices may receive content and data via input/output (I/O) paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)).

By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes machine learning model 202, which may be implemented on user device 222 and user device 224 or may be accessible by communication paths 228 and 230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storage may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 4G or LTE network), a cable network, a public switched telephone network, or other types of communications networks or combinations of communications networks. Communication paths 228, 230, and 232 may include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, machine learning model 202 may take inputs 204 and provide outputs 206. The inputs may include multiple data sets such as a training data set and a test data set. Each of the plurality of data sets (e.g., inputs 204) may include data subsets with common characteristics. The common characteristics may include characteristics about a user, competency level, parts of speech, user actions, and/or characteristics of user actions. In some embodiments, outputs 206 may be fed back to machine learning model 202 as input to train machine learning model 202 (e.g., alone or in conjunction with user indications of the accuracy of outputs 206, labels associated with the inputs, or other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, machine learning model 202 may be trained to generate better predictions.

In some embodiments, machine learning model 202 may include an artificial neural network. In such embodiments, machine learning model 202 may include an input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 (e.g., whether or not a user action of a user corresponds to a predetermined competency level), and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, backpropagation techniques may be utilized by machine learning model 202 where forward stimulation is used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202 (e.g., whether or not a word corresponds to a particular part of speech).

In some embodiments, machine learning model 202 may comprise a convolutional neural network. The convolutional neural network is an artificial neural network that features one or more convolutional layers. Convolutional layers extract features from an input (e.g., a document). Convolution preserves the relationship between pixels by learning image features using small squares of input data. For example, convolution may preserve the relationship between the individual portions of a document. In some embodiments, machine learning model 202 may comprise an adversarial neural network (e.g., as described in-depth in relation to FIG. 4). For example, machine learning model 202 may comprise a plurality of neural networks, in which the neural networks are pitted against each other in an attempt to spot weaknesses in the other.

System 200 also includes API layer 250. API layer 250 may allow the system to generate summaries across different devices. In some embodiments, API layer 250 may be implemented on user device 222 or user device 224. Alternatively or additionally, API layer 250 may reside on one or more of cloud components 210.

Cloud components 210 may include model 202, which may be a machine learning model, artificial intelligence model, etc. (which may be referred collectively as "models" herein). Model 202 may take inputs 204 and provide outputs 206. The inputs may include multiple datasets, such as a training dataset and a test dataset. Each of the plurality of datasets (e.g., inputs 204) may include data subsets related to user data, predicted forecasts and/or errors, and/or actual forecasts and/or errors. In some embodiments, outputs 206 may be fed back to model 202 as input to train model 202 (e.g., alone or in conjunction with user indications of the accuracy of outputs 206, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a given diagnostic asset for a given user).

API layer 250 (which may be a REST or Web services API layer) may provide a decoupled interface to data and/or functionality of one or more applications. API layer 250 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 250 may use various architectural arrangements. For example, system 200 may be partially based on API layer 250, such that there is strong adoption of SOAP and RESTful Web services, using resources like Service Repository and Developer Portal, but with low governance, standardization, and separation of concerns. Alternatively, system 200 may be fully based on API layer 250, such that separation of concerns between layers like API layer 250, services, and applications are in place.

In some embodiments, the system architecture may use a microservice approach. Such systems may use two types of layers: front-end layer and back-end layer, where microservices reside. In this kind of architecture, the role of API layer 250 may provide integration between front-end and back-end layers. In such cases, API layer 250 may use RESTful APIs (exposition to front-end or even communication between microservices). API layer 250 may use AMQP (e.g., Kafka, RabbitMQ, etc.). API layer 250 may employ incipient usage of new communications protocols such as gRPC, Thrift, etc.

In some embodiments, the system architecture may use an open API approach. In such cases, API layer 250 may use commercial or open source API platforms and their modules. API layer 250 may use a developer portal. API layer 250 may use strong security constraints applying WAF and DDoS protection, and API layer 250 may use RESTful APIs as standard for external integration.

System 200 may also include additional components for generating personalized diagnostic assets, dynamically creating personalized diagnostic assets, and/or generating content based on the strengths, weaknesses, and/or competency level of users.

The system may retrieve available content and assets from asset database 260. Available content and assets may be published and publicly available content. Additionally or alternatively, available content and assets may include content retrieved from one or more licensed sources. In some embodiments, the system may invoke web crawlers and/or content aggregators to populate a data store of available content.

In some embodiments, the retrieved available content and assets may be filtered based on the user. For example, the system may use a data set for the user that is selected based on the ultimate goal of the user (e.g., a particular information retrieval goal). The content and assets may then be selected as diagnostic assets that may be further modified based on the user.

For example, the system may then apply semantic analysis and tagging to the content. For example, the system may apply latent semantic analysis, latent semantic indexing, latent Dirichlet allocation, and/or n-grams and hidden Markov models to available content and assets. The system may assign descriptive tags to the content that indicate the complexity, subject matter, and meaning of the content to generate tagged content. During this natural language processing, the system may incorporate one or more of the machine learning and/or artificial neural networks as described herein.

Tagged content may include a plurality of descriptive tags. The descriptive tags may indicate keywords (e.g., corresponding to particular parts of speech, information retrieval goals, etc.) associated with tagged content, may indicate the competency level of tagged content, and may include an individual identifier for tagged content. For example, the descriptive tags associated with tagged content may be used to match tagged content to content type preferences of a user when selecting a diagnostic asset, match tagged content to a particular information retrieval goal, match tagged content to a particular competency level, etc.

The system may determine the competency level of the user with a varying degree of granularity and using multiple qualitative and/or quantitative metrics. The system may categorize the competency level of the user on an individual and/or group level. Each category (e.g., representations of the user's competency in different information retrieval tasks, knowledge of information systems, knowledge of local rules, etc.) may represent a set of related vectors, with each vector corresponding to a subcategory of the category.

In some embodiments, the system may determine one or more user skills that are affected by a given user action, a given diagnostic asset, and/or a user action on a given diagnostic asset. For example, the system may tag each skill category and/or subcategory with the user actions that affect it as well as an amount that the user action affects the category. In some embodiments, the system may calculate an amount of effect based on the given user action, the given diagnostic asset, and/or the user action on a given diagnostic asset.

The system may update the skills of the user based on monitoring user actions. For example, in response to correct answers, the system may increase a corresponding skill of a user. As the system updates the quantitative or qualitative competency level of the user (e.g., based on the one or more relevant skills of the user), the system may feed this information back to refine the selection of diagnostic assets and/or questions for diagnostic assets in order to focus on particular weaknesses and/or information retrieval goals of the user.

In some embodiments, the system may compare the quantitative competency level of the user (e.g., a numerical score) to one or more thresholds (e.g., a threshold score) that correspond to a competency level in order to determine whether or not the quantitative competency level of the user equals or exceeds the competency level. In some embodiments, the system may compare the quantitative competency level of the user (e.g., a numerical score) to one or more ranges (e.g., a threshold range) that correspond to a competency level in order to determine whether or not the quantitative competency level of the user corresponds to the competency level.

Figure 3:
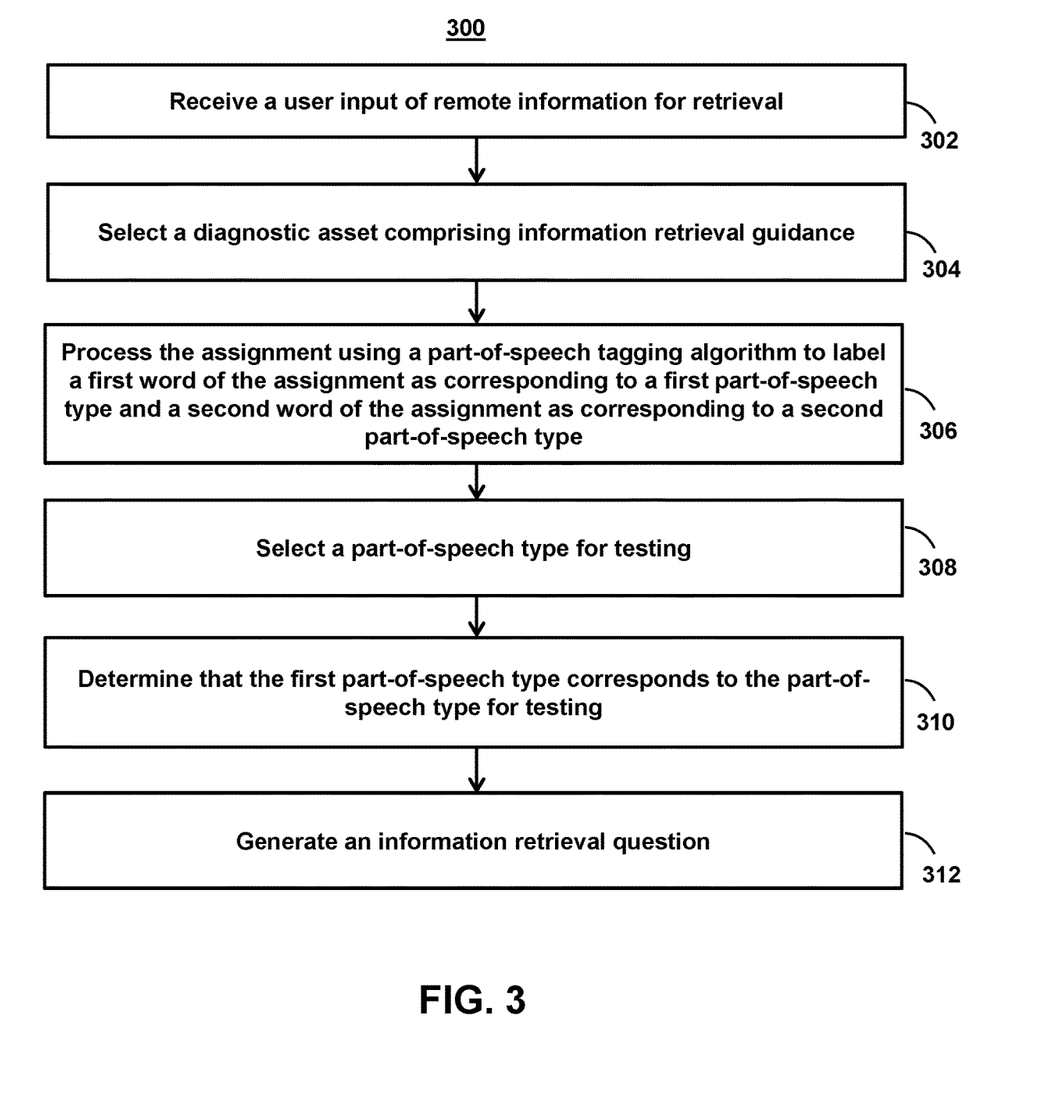
FIG. 3 shows a flowchart of steps for generating information retrieval questions for determining user competency in information retrieval with natural language processing using a part-of-speech tagging algorithm, in accordance with one or more embodiments.

FIG. 3 shows a flowchart of steps for generating information retrieval questions for determining user competency in information retrieval with natural language processing using a part-of-speech tagging algorithm, in accordance with one or more embodiments. For example, process 300 may represent the steps taken by one or more devices as shown in FIGS. 1-2. Additionally, process 300 may incorporate one or more of the features described in relation to FIGS. 4-5.

At step 302, process 300 (e.g., via control circuitry) receives a user input of remote information for retrieval. For example, the system may receive a text input of specific information to be accessed, retrieved, and/or submitted and/or other operations to be performed. In some embodiments, the system may retrieve a content type preference of a user from a user profile. For example, as described in FIG. 1 above, the system may accumulate information about the user to tailor the user experience of that user. This may include tailoring diagnostic assets, content for questions, etc. to the preferences of the user. The system may then select a diagnostic asset corresponding to the content type preference. For example, the system may retrieve information (e.g., from user profile 110 (FIG. 1)) that indicates a preferred genre of the user. The system may then select diagnostic assets in that genre. For example, the system may refer to descriptive tags assigned to different diagnostic assets (e.g., as described in FIG. 2) to match diagnostic assets to content type preferences of a user.

At step 304, process 300 (e.g., via control circuitry) selects a diagnostic asset corresponding to the remote information. The diagnostic asset may comprise information that describes the process for accessing, retrieving, and/or submitting the remote information and/or other operations, regulations, and/or formats that are relevant. For example, the system may filter one or more diagnostic assets based on the type of information at issue. Additionally or alternatively, the system may retrieve a particular template corresponding to the information that is then populated with relevant content.

At step 306, process 300 (e.g., via control circuitry) processes the diagnostic asset using a part-of-speech tagging algorithm to label a first word of the diagnostic asset as corresponding to a first part-of-speech type and a second word of the diagnostic asset as corresponding to a second part-of-speech type. For example, the system may use the Viterbi algorithm, the Brill tagger, Constraint Grammar, and the Baum-Welch algorithm (also known as the forward-backward algorithm) to tag words, sentences, etc. in the assignment. The system may identify one or more of the nine parts of English speech: noun, verb, article, adjective, preposition, pronoun, adverb, conjunction, and interjection as well as additional categories and/or subcategories.

At step 308, process 300 (e.g., via control circuitry) selects a part-of-speech type for testing in the diagnostic asset. For example, the system may retrieve information that indicates that the information retrieval corresponding to a particular part of speech (e.g., a particular noun, verb, etc.) has specific requirements. In response, the system may generate a diagnostic asset that targets that part of speech. For example, the system may retrieve a user competency level from a user profile and select the information retrieval question corresponding to the first word based on the user competency level. Additionally or alternatively, the system may retrieve a first competency level for the first part-of-speech type from the user profile. The system may then compare the first competency level to a threshold competency level (e.g., a competency level corresponding to a projected progress through the retrieval guidance). The system may then select the part-of-speech type for testing in the diagnostic asset based on the first competency level not equaling or exceeding the threshold competency level. For example, in response to determining that the user is weak with respect to a given part-of-speech type, the system may generate a diagnostic asset targeting that part-of-speech type.

Additionally or alternatively, the system may retrieve a first competency level for the first part-of-speech type from a user profile. The system may also retrieve a second competency level for the second part-of-speech type from the user profile. The system may then compare the first competency level to the second competency level and select the part-of-speech type for testing in the diagnostic asset based on the first competency level not equaling or exceeding the second competency level. For example, the system may compare the level of skill of one or more part-of-speech types to determine what part-of-speech type is the weakest of the user. The system may generate a diagnostic asset targeting that part of speech. For example, the system may generate diagnostic assets according to static or dynamic retrieval guidance. The retrieval guidance may be designed to touch on various part-of-speech types in a given order for increased efficiency.

At step 310, process 300 (e.g., via control circuitry) determines that the first part-of-speech type corresponds to the part-of-speech type for testing. For example, the system may parse the language of the diagnostic asset to identify a word, sentence, etc. that matches the part-of-speech type. The system may then compare the parsed content (or a tag of the parsed content) for matches. Upon detecting a match, the system selects the word, sentence, etc. for use in generating content.

At step 312, process 300 (e.g., via control circuitry) generates content for an information retrieval question corresponding to the first word in response to determining that the first part-of-speech type corresponds to the part-of-speech type for testing. For example, as shown and described in FIG. 1 above, the system may generate content corresponding to the first part-of-speech type.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 3.

Figure 4:
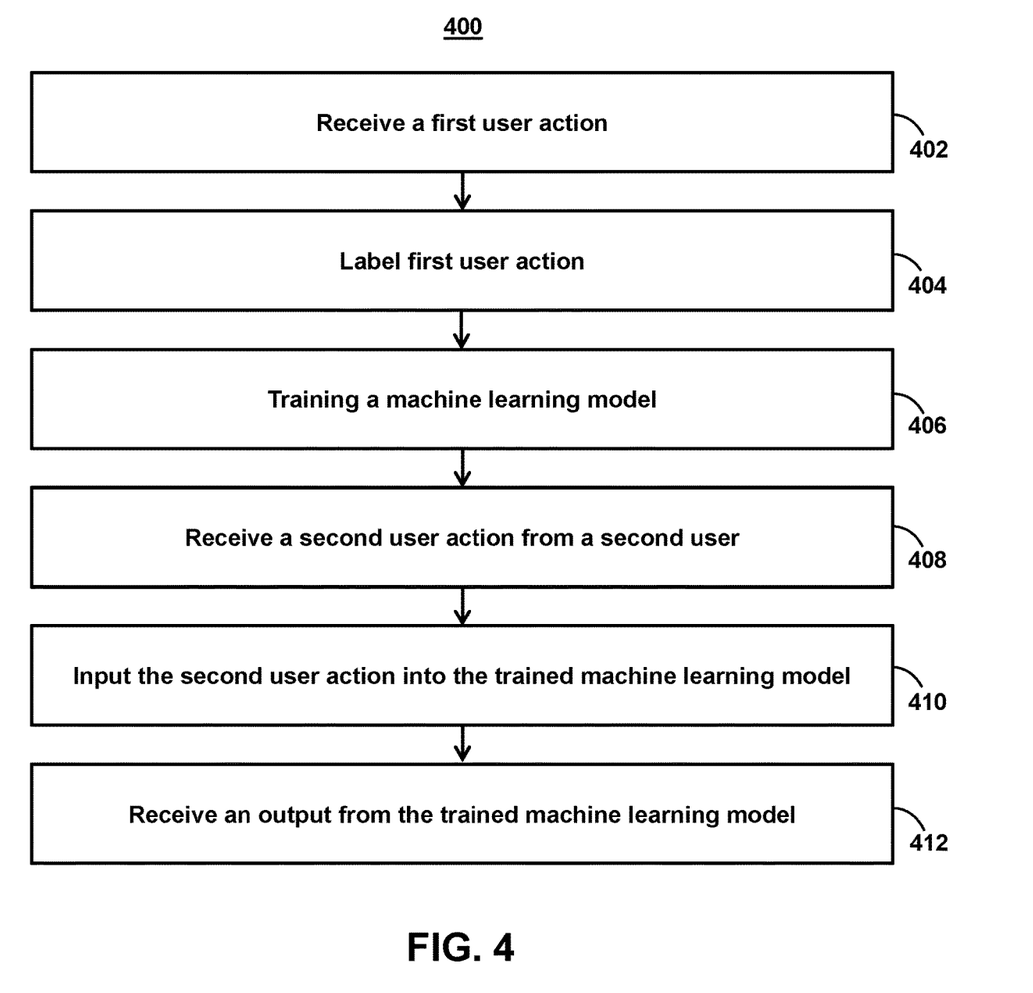
FIG. 4 shows a flowchart of steps for determining a user competency level while retrieving remotely accessible data using a machine learning model, in accordance with one or more embodiments.

FIG. 4 shows a flowchart of steps for determining a user competency level while retrieving remotely accessible data using a machine learning model, in accordance with one or more embodiments. For example, process 400 may represent the steps taken by one or more devices as shown in FIGS. 1-2. Additionally, process 400 may incorporate one or more of the features described in relation to FIG. 3 or FIG. 5.

At step 402, process 400 (e.g., via control circuitry) receives a first user action (e.g., a selection of a user) from a first user that is interacting with a first diagnostic asset, wherein the first user action has a first characteristic (e.g., a part of speech and/or content of a part of speech).

At step 404, process 400 (e.g., via control circuitry) labels the first user action with a known user competency level. For example, the system may receive this information via a manual input (e.g., from an instructor), from a third party (e.g., a government, industry, or other standards organization that designates proficiency in languages), and/or based on a model prediction or similar scores/average across a population of users.

At step 406, process 400 (e.g., via control circuitry) trains a machine learning model to detect the known user competency level on the labeled first user action. For example, as described in FIG. 2 above, the system may train itself to classify given user actions and/or characteristics of those actions into determined competency levels.

At step 408, process 400 (e.g., via control circuitry) receives a second user action (e.g., a selection of a different user) from a second user that is interacting with a second diagnostic asset, wherein the second user action has a second characteristic (e.g., a part of speech and/or content of a part of speech).

At step 410, process 400 (e.g., via control circuitry) inputs the second user action into the trained machine learning model. For example, after training the artificial neural network, the system may receive user actions from another user. The user action and/or the characteristics of that user action may be input into the trained artificial neural network to determine the competency level of the second user. For example, as described in FIG. 2 above, the system may train itself to classify given user actions and/or characteristics of those actions into determined competency levels. The system may use a plurality of models and algorithms, including adversarial models for training. Additionally, the system may train the artificial neural network to detect the known user competency level based on a labeled third array, wherein the labeled third array is based on a third user action from a third user that is interacting with a third diagnostic asset, and wherein the third user action has a third characteristic. For example, the system may determine a user competency level from multiple user actions and/or characteristics of those actions. In such cases, the system may aggregate data about the user actions into a quantitative or qualitative score. The score may then be compared to given ranges corresponding to a known competency level. For example, the system may determine a range for the second characteristic for the second user action based on the first characteristic and then determine that the second characteristic is within the range. If the second characteristic is within the range, the system may determine that the second user has the known competency level.

Additionally, the system may train the artificial neural network to detect the known user competency level based on a labeled third array, wherein the labeled third array is based on the first user's self-assessed competency level. For example, the system may store a user's answer to a self-assessment question and use that answer to influence the determined competency level of the user. Additionally, the artificial neural network may be trained to determine the actual competency level of a user based on the user's self-assessed competency level.

At step 412, process 400 (e.g., via control circuitry) receives an output from the trained machine learning model indicating that the second user has the known user competency level. For example, based on the received user action, the system may determine the competency level of the user. As the artificial neural network is robust and trained on a plurality of test data, the artificial neural network may classify a competency level of the user even though the assignment, user action, and/or characteristic of the user action may be unique to the user.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 4.

Figure 5:
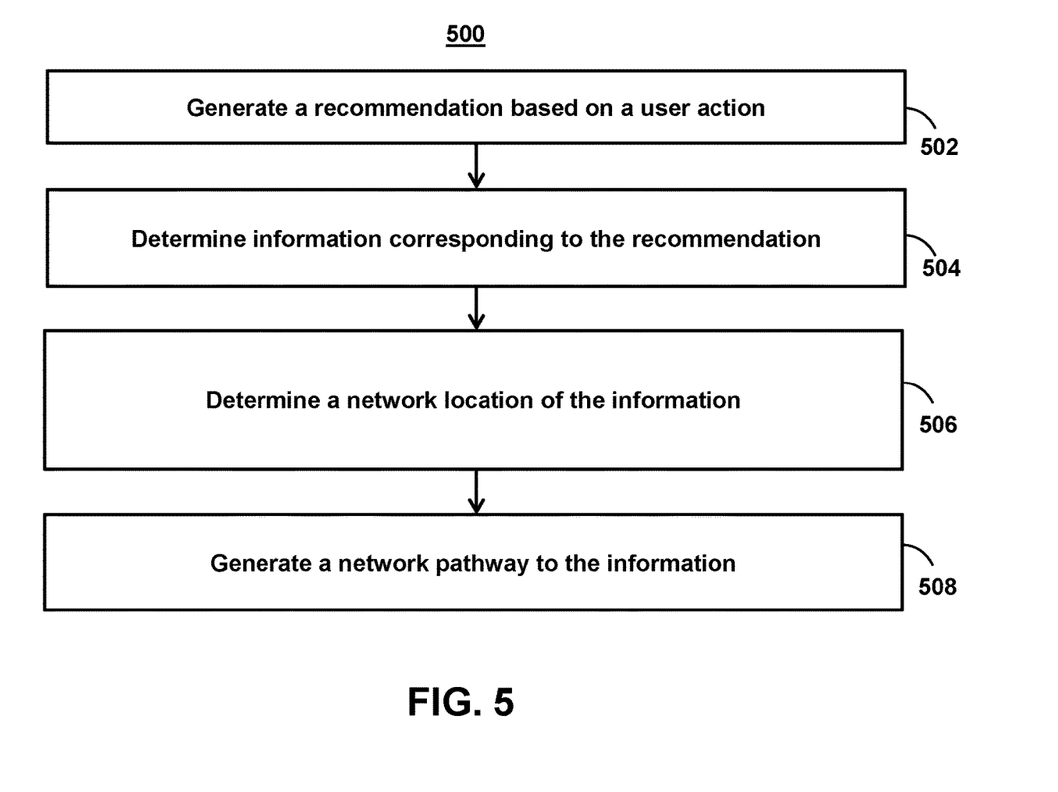
FIG. 5 shows a flowchart of the steps involved in providing information retrieval and network pathway guidance, in accordance with one or more embodiments.

FIG. 5 shows a flowchart of the steps involved in providing information retrieval and network pathway guidance, in accordance with one or more embodiments. For example, process 500 may represent the steps taken by one or more devices, as shown in FIGS. 1-3, when retrieving remotely accessible data, determining a location of remotely accessible information, and/or determining network guidance for the information.

In some embodiments, the system may determine a level of competency based on where information is located and/or what network pathway is required to access the information. In some embodiments, the system may receive a level of competency. The system may then use this information to populate diagnostic assets for multiple users (e.g., a first user requesting the information and a second user aiding in the retrieval of the information). The user may then contact (e.g., via the same or a different platform) another user and/or device. The other user (and/or device) may, e.g., be a service representative associated with a provider of information. In order to improve the interaction between the first user and the second user (and/or the second device), the system may provide a recommendation to the second user/device about potential questions that the first user may have, what information the first user needs, where the information is located, and/or specific content to assist the first user in accessing the information. Additionally or alternatively, the system may locate information in the system of the second user/device, determine a network pathway to quickly and efficiently retrieve this information, and/or pre-fetch this information. In each case, the system may more efficiently (and in less time) obtain relevant information that may inform the second user/device about potential questions/informational needs of the first user.

At step 502, process 500 (e.g., using one or more components in system 200 (FIG. 2)) generates a recommendation based on a user action of the first user. For example, in response to an initial user input, the system may recommend an additional action for the user in a diagnostic asset. In another example, the system may, in response to detecting a user action, monitor for another user action, wherein the other user action is not received via the user interface, and wherein the other user action corresponds to a first user contacting a second user. In response to detecting the other user action, the system may generate, at a second user interface corresponding to the second user, a recommendation selected by the machine learning model.

At step 504, process 500 (e.g., using one or more components in system 200 (FIG. 2)) determines information corresponding to the recommendation. For example, the system may determine information corresponding to the recommendation at the first user interface. This may include content for assisting the first user in accessing needed information and/or the information itself.

At step 506, process 500 (e.g., using one or more components in system 200 (FIG. 2)) determines a network location of the information. For example, the system may determine a network location of the user information (e.g., on a network associated with the second user interface).

At step 508, process 500 (e.g., using one or more components in system 200 (FIG. 2)) generates network pathway guidance to the user. For example, the system may generate a network pathway (e.g., on the network associated with the second user interface) to the user information.

In some embodiments, the system may automatically retrieve the information from the network location. For example, the system may automatically retrieve the information from the network location in response to the other user action. The system may then generate the information to the user and/or other users. For example, the system may generate for display the user information on the second user interface. For example, the system may generate for display the user information on the second user interface of a second user, wherein the second user interface is located remotely from the first user interface (e.g., of the first user).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for providing information retrieval and network pathway guidance using natural language processing.
2. The method of the preceding embodiment, the method comprising: receiving a user input of remote information for retrieval; selecting a diagnostic asset corresponding to the remote information; processing the diagnostic asset using a part-of-speech tagging algorithm to label a first word of the diagnostic asset as corresponding to a first part-of-speech type and a second word of the diagnostic asset as corresponding to a second part-of-speech type; selecting a part-of-speech type for testing in the diagnostic asset; determining that the first part-of-speech type corresponds to the part-of-speech type for testing; and in response to determining that the first part-of-speech type corresponds to the part-of-speech type for testing, generating content for an information retrieval question corresponding to the first word.
3. The method of any one of the preceding embodiments, further comprising: receiving a user response to the information retrieval question; and determining a user competency level based on the user response.
4. The method of any one of the preceding embodiments, further comprising: receiving a user response to the information retrieval question; determining a user competency level based on the user response; and generating content for information retrieval guidance corresponding to the user competency level.
5. The method of any one of the preceding embodiments, further comprising: receiving a user response to the information retrieval question; determining a user competency level based on the user response; determining a location of the remote information; and generating content for information retrieval guidance corresponding to the user competency level and the location.
6. The method of any one of the preceding embodiments, further comprising: determining a location of the remote information; determining a network pathway to the location; and generating content for information retrieval guidance corresponding to the network pathway.
7. The method of any one of the preceding embodiments, further comprising: determining that a threshold amount of time has passed since generating the content for the information retrieval question; and in response to determining that the threshold amount of time has passed, querying a remote user for the remote information.

8. The method of any one of the preceding embodiments, further comprising: retrieving a content type preference of a user from a user profile; and filtering available diagnostic assets based on the content type preference.

9. The method of any one of the preceding embodiments, further comprising: retrieving a user competency level from a user profile; and selecting the content for the information retrieval question corresponding to the first word based on the user competency level.

10. The method of any one of the preceding embodiments, further comprising: retrieving a first competency level for the first part-of-speech type from a user profile; comparing the first competency level to a threshold competency level; and selecting the part-of-speech type for testing in the diagnostic asset based on the first competency level not equaling or exceeding the threshold competency level.

11. The method of any one of the preceding embodiments, further comprising: retrieving a first competency level for the first part-of-speech type from a user profile; retrieving a second competency level for the second part-of-speech type from the user profile; comparing the first competency level to the second competency level; and selecting the part-of-speech type for testing in the diagnostic asset based on the first competency level not equaling or exceeding the second competency level.

12. The method of any one of the preceding embodiments, further comprising: training an artificial intelligence model to detect a known user competency level based on a labeled first user action and a labeled third user action, wherein the labeled first user action is from a first user that is interacting with a first different diagnostic asset, and wherein the labeled third user action is from a third user that is interacting with a third different diagnostic asset; receiving a second user action from a second user while the second user is interacting with a second diagnostic asset; inputting the second user action into the artificial intelligence model; and receiving an output from the artificial intelligence model indicating that the second user has the known user competency level.

13. The method of any one of the preceding embodiments, further comprising: receiving a first user action from a first user that is interacting with a first diagnostic asset, wherein the first user action has a first characteristic; labeling the first user action with a known user competency level; training an artificial intelligence model to detect the known user competency level on the first user action; receiving a second user action from a second user that is interacting with a second diagnostic asset, wherein the second user action has a second characteristic; inputting the second user action into the artificial intelligence model; and receiving an output from the artificial intelligence model indicating that the second user has the known user competency level.

14. The method of any one of the preceding embodiments, wherein training the artificial intelligence model to detect the known user competency level on the first user action comprises: determining a range for the second characteristic for the second user action based on the first characteristic; and determining that the second characteristic is within the range.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for providing information retrieval and network pathway guidance using natural language processing, the system comprising:
one or more processors; and
a non-transitory, computer-readable medium comprising instructions that when executed by the one or more processors cause operations comprising:
receiving a user input of remote information for retrieval;
selecting a first diagnostic asset corresponding to the remote information;
processing the first diagnostic asset using a part-of-speech tagging algorithm to label a first word of the first diagnostic asset as corresponding to a first part-of-speech type and a second word of the first diagnostic asset as corresponding to a second part-of-speech type;
selecting a part-of-speech type for testing in the first diagnostic asset;
determining that the first part-of-speech type corresponds to the part-of-speech type for testing;
in response to determining that the first part-of-speech type corresponds to the part-of-speech type for testing, generating a first information retrieval question corresponding to the first word;
receiving a first user response to the first information retrieval question;
determining a first user competency level based on the first user response;
determining a first location of the remote information;
generating first information retrieval guidance corresponding to the first user competency level and the first location; and
simultaneously displaying, in a user interface, the first information retrieval guidance and a second diagnostic asset corresponding to the remote information.

2. A method for providing information retrieval and network pathway guidance using natural language processing, the method comprising:
receiving, by one or more processors, a user input of remote information for retrieval;
selecting, by the one or more processors, a diagnostic asset corresponding to the remote information;
processing, by the one or more processors, the diagnostic asset using a part-of-speech tagging algorithm to label a first word of the diagnostic asset as corresponding to a first part-of-speech type and a second word of the diagnostic asset as corresponding to a second part-of-speech type;
selecting, by the one or more processors, a part-of-speech type for testing in the diagnostic asset;
determining, by the one or more processors, that the first part-of-speech type corresponds to the part-of-speech type for testing;
in response to determining that the first part-of-speech type corresponds to the part-of-speech type for testing, generating, by the one or more processors, an information retrieval question corresponding to the first word of the diagnostic asset;
receiving, by the one or more processors, a user response to the information retrieval question;
determining, by the one or more processors, a user competency level based on the user response;
automatically generating, by the one or more processors, information retrieval guidance corresponding to the user competency level; and
displaying, by the one or more processors, in a user interface, the information retrieval guidance.

3. The method of claim 2, further comprising:
determining a location of the remote information; and
generating the information retrieval guidance corresponding to the user competency level and the location.

4. The method of claim 2, further comprising:
determining a location of the remote information;
determining a network pathway to the location; and
generating the information retrieval guidance corresponding to the network pathway.

5. The method of claim 2, further comprising:
determining that a threshold amount of time has passed since generating the information retrieval question; and
in response to determining that the threshold amount of time has passed, querying a remote user for the remote information.

6. The method of claim 2, further comprising:
retrieving a content type preference of a user from a user profile; and
filtering available diagnostic assets based on the content type preference.

7. The method of claim 2, further comprising:
retrieving the user competency level from a user profile; and
selecting the information retrieval question corresponding to the first word of the diagnostic asset based on the user competency level.

8. The method of claim 2, further comprising:
retrieving a first competency level for the first part-of-speech type from a user profile;
comparing the first competency level to a threshold competency level; and
selecting the part-of-speech type for testing in the diagnostic asset based on the first competency level not equaling or exceeding the threshold competency level.

9. The method of claim 2, further comprising:
retrieving a first competency level for the first part-of-speech type from a user profile;
retrieving a second competency level for the second part-of-speech type from the user profile;
comparing the first competency level to the second competency level; and
selecting the part-of-speech type for testing in the diagnostic asset based on the first competency level not equaling or exceeding the second competency level.

10. The method of claim 2, further comprising:
training an artificial intelligence model to detect a known user competency level based on a labeled first user action and a labeled third user action, wherein the labeled first user action is from a first user that is interacting with a first different diagnostic asset, and wherein the labeled third user action is from a third user that is interacting with a third different diagnostic asset;
receiving a second user action from a second user while the second user is interacting with a second diagnostic asset;
inputting the second user action into the artificial intelligence model; and
receiving an output from the artificial intelligence model indicating that the second user has the known user competency level.

11. The method of claim 2, further comprising:
receiving a first user action from a first user that is interacting with a first diagnostic asset, wherein the first user action has a first characteristic;
labeling the first user action with a known user competency level;
training an artificial intelligence model to detect the known user competency level on the first user action;
receiving a second user action from a second user that is interacting with a second diagnostic asset, wherein the second user action has a second characteristic;
inputting the second user action into the artificial intelligence model; and
receiving an output from the artificial intelligence model indicating that the second user has the known user competency level.

12. The method of claim 11, wherein training the artificial intelligence model to detect the known user competency level on the first user action comprises:
determining a range for the second characteristic for the second user action based on the first characteristic; and
determining that the second characteristic is within the range.

13. A non-transitory, computer-readable medium comprising instructions that when executed by one or more processors cause operations comprising:
receiving a user input of remote information for retrieval;
selecting a diagnostic asset corresponding to the remote information;
processing the diagnostic asset using a part-of-speech tagging algorithm to label a first word of the diagnostic asset as corresponding to a first part-of-speech type and a second word of the diagnostic asset as corresponding to a second part-of-speech type;
selecting a part-of-speech type for testing in the diagnostic asset;
determining that the first part-of-speech type corresponds to the part-of-speech type for testing;
in response to determining that the first part-of-speech type corresponds to the part-of-speech type for testing, generating an information retrieval question corresponding to the first word of the diagnostic asset;
receiving a user response to the information retrieval question;
determining a user competency level based on the user response;
generating information retrieval guidance corresponding to the user competency level; and
displaying, in a user interface, the information retrieval guidance.

14. The non-transitory, computer-readable medium of claim 13, wherein the instructions further cause operations comprising:
determining a location of the remote information; and
generating the information retrieval guidance corresponding to the user competency level and the location.

15. The non-transitory, computer-readable medium of claim 13, wherein the instructions further cause operations comprising:
determining a location of the remote information;
determining a network pathway to the location; and generating the information retrieval guidance corresponding to the network pathway.

16. The non-transitory, computer-readable medium of claim 13, wherein the instructions further cause operations comprising:
  determining that a threshold amount of time has passed since generating the information retrieval question; and
  in response to determining that the threshold amount of time has passed, querying a remote user for the remote information.

* * * * *